3,518,288
POLYOXYETHYLENE SILOXANE BRANCH COPOLYMERS

Loren A. Haluska, Midland, Mich., assignor to Dow Corning Corporation, Midland, Mich., a corporation of Michigan
No Drawing. Filed May 2, 1966, Ser. No. 546,548
Int. Cl. C07f 7/10
U.S. Cl. 260—448.2                                 5 Claims

ABSTRACT OF THE DISCLOSURE

New siloxane polyalkylene oxide copolymers are disclosed which are useful in the preparation of rigid polyurethane foams. These new copolymers make it possible to consistently produce uniform fine-celled foams having a high percentage of closed cells under a wide variety of manufacturing conditions.

---

This invention relates to an improved method for making rigid polyurethane foams and an additive therefor.

One of the fastest growing industries in recent decades has been the one directed to products made from foamed materials. These foam products have found many diverse uses such as in filters for cigarettes, filters for air conditioning systems, fuel filters, thermal and cryogenic insulations, sound insulation, structural and dimensional supports, laminated structures, protective packaging for fragile items, candle holders, bases for table decorations (center pieces), christmas tree ornaments and toys. The foamed products are generally identified as being either of the flexible or rigid type, and can be of any of the basic chemical classes of foams well known in the art. Not only does each chemical class of foam have its own peculiar problem, but also each type of foam (flexible or rigid) within that class has its own problems. To further complicate the picture, the particular intended utility of the foam usually demands some special considerations too.

As was pointed out above, this invention is directed to polyurethane foams of the rigid type. It is an object of this invention to provide an improved method for making rigid polyurethane foams. Another object is to provide an additive useful for making rigid polyurethane foams. Still another object of this invention to provide an additive and method whereby it is possible to consistently produce uniform, fine-celled rigid polyurethane foams having a high percentage of closed cells under a wide variety of manufacturing conditions. It is a further object to provide an additive and method for making rigid polyurethane foams adaptable to a wide range of foaming conditions and foaming systems, including both one-shot and prepolymer systems. Yet another object is to provide an additive and method for making rigid polyurethane foams which are superior for foamed-in-place applications by virtue of excellent flowability. Other advantages of the additive and method of this invention include hydrolytic and chemical stability in storage or mixtures with most systems; improved compatibility with foam ingredients including additives such as viscosity stabilizers and flame-retardants; improved miscibility through greater retention of fluorocarbon blowing agents in mixes; and handling ease including desirable low viscosity ideal for production equipment. Other objects and advantages of this invention will be apparent from the following detailed description.

More specifically, this invention relates to an improvement in a method of making a rigid polyurethane foam which includes mixing together a polymer selected from the group consisting of hydroxylated polyesters and hydroxylated polyethers, an organic polyisocyanate, a catalyst and a blowing agent, the improvement comprising incorporating therein a compound selected from the group consisting of siloxanes having the average structural formulae (1)
$R_aSi\{[OSi(CH_3)_2]_b[OSi(CH_3)A]_cOSi(CH_3)_2A\}_{4-a}$
(2)
$R_aSi\{[OSi(CH_3)_2]_b[SOi(CH_3)A]_dOSi(CH_3)_3\}_{4-a}$
(3)
$A(CH_3)_2Si[OSi(CH_3)_2]_b[OSi(CH_3)A]_eOSi(CH_3)_2A$
and
(4)
$(CH_3)_3Si[OSi(CH_3)_2]_b[OSi(CH_3)A]_dOSi(CH_3)_3$ in which formulae A is a hydrocarbon radical free of aliphatic unsaturation and contains from 1 to 10 carbon atoms, A is a radical of the structure $$-D(OC_2H_4)_fG$$

wherein D is an alkylene radical, G is a radical selected from the group consisting of the

radicals wherein R is as defined above, $f$ has an average value from 9 to 30, $a$ has an average value from 0 to 1, $b$ has an average value from 6 to 192, $c$ has an average value from 0 to 30, $d$ has an average value from 3 to 30, and $e$ has an average value from 1 to 30, the ratio of the $OSi(SH_3)_2$ units to the $OSi(CH_3)A$ and/or $OSi(CH_3)_2A$ units in the siloxane being in the range of 2:1 to 6:1.

This invention further relates to an additive for making improved rigid polyurethane foams which is a compound selected from the group consisting of siloxanes having the average structural formulae (1)
$R_aSi\{[OSi(CH_3)_2]_b[OSi(CH_3)A]_cOSi(CH_3)_2A\}_{4-a}$
(2)
$R_aSi\{[OSi(CH_3)_2]_b[OSi(CH_3)A]_dOSi(CH_3)_3\}_{4-a}$
(3)
$A(CH_3)_2Si[OSi(CH_3)_2]_b[OSi(CH_3)A]_eOSi(CH_3)_2A$
and
(4)
$(CH_3)_3Si[OSi(CH_3)_2]_b[OSi(CH_3)A]_dOSi(CH_3)_3$ in which formulae R is a hydrocarbon radical free of aliphatic unsaturation and contains from 1 to 10 carbon atoms, A is a radical of the structure $$-D(OC_2H_4)_fG$$

wherein D is an alkylene radical, G is a radical selected from the group consisting of the

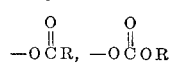

and

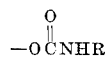

radicals wherein R is as defined above, $f$ has an average value from 9 to 30, $a$ has an average value from 0 to 1, $b$ has an average value from 6 to 192, $c$ has an average value from 0 to 30, $d$ has an average value from 3 to 30, and $e$ has an average value from 1 to 30, the ratio of the $OSi(CH_3)_2$ units to the $OSi(CH_3)A$ and/or $OSi(CH_3)_2A$ units in the siloxane being in the range of 2:1 to 6:1.

As is apparent from the above defined process, the hydroxylated materials and polyisocyanates which are reacted to form the urethane polymer, the catalyst for promoting the reaction, and the blowing agent for foaming the mixture, are all well known to those skilled in the art. Since these materials do not go to the essence of this invention, and since detailed listings and descriptions of them exist numerous places elsewhere, no further mention will be made of them here.

The siloxanes used in the above process, which constitute the additives of this invention, are new compounds. These siloxanes can be readily prepared by well known methods. For example, they can be prepared by reacting the appropriate ≡SiH containing siloxane with the appropriate polyethylene glycol having a terminally unsaturated aliphatic group on one end and an appropriate capping group on the other end, the reaction being carried out in the presence of a platinum catalyst in a suitable solvent. While this type of reaction is generally well known to those skilled in the art, the preparation of the siloxanes of this invention will be illustrated in more detail in the examples for the benefit of the tyros.

The siloxanes that will achieve the objects of this invention are relatively few as should be apparent from the formulae supra. Thus, with the exceptions of the R and A groups, essentially all substitutents on the silicon atoms must be methyl radicals.

The R group in Formulae 1 and 2 can be any hydrocarbon radical free of aliphatic unsaturation which contains from 1 to 10 carbon atoms. For example, R can be an alkyl, cycloalkyl, aryl, alkaryl or an aralkyl radical. By way of illustration, R can be a methyl, ethyl, propyl, isopropyl, butyl, tertiary butyl, amyl, hexyl, heptyl, octyl, nonyl, decyl, cyclopentyl, cyclohexyl, phenyl, naphthyl, tolyl, xylyl, mesityl, t-butylphenyl, benzyl, 2-phenylethyl or a 2-phenylpropyl radical.

The A radical in the above formulae must have the structure —D(OC$_2$H$_4$)$_f$G. In this structure D is any alkylene radical. For example, D can be a methylene, ethylene, propylene, butylene, isobutylene, hexylene, octylene, dodecylene, octadecylene or a triacontylene radical. Preferably, D contains from 3 to 18 carbon atoms.

In the structure of A, the G radical can be an acyloxy $$(-O\overset{O}{\underset{\|}{C}}R)$$

carbonate ester $$(-O\overset{O}{\underset{\|}{C}}OR)$$

or an isocyanate $$(-O\overset{O}{\underset{\|}{C}}NHR)$$

radical. Of these, the acyloxy and isocyanate radicals are preferred with the latter being the most preferred. Specific illustrative example of the G group are $$-O\overset{O}{\underset{\|}{C}}CH_3$$

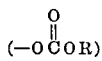

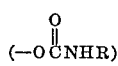

$$-O\overset{O}{\underset{\|}{C}}OCH_3$$

$$-O\overset{O}{\underset{\|}{C}}OC_4H_9$$

$$-O\overset{O}{\underset{\|}{C}}OC_6H_5$$

$$-O\overset{O}{\underset{\|}{C}}NHC_3H_7$$

$$-O\overset{O}{\underset{\|}{C}}NHC_5H_{11}$$

$$-O\overset{O}{\underset{\|}{C}}NHC_{10}H_{21}$$

and $$-O\overset{O}{\underset{\|}{C}}NHC_6H_5$$

The values of the various subscripts $a$, $b$, $c$, $d$, $e$ and $f$ have been set forth above and define the limits of the differing portions of the copolymers so that the advantages and objects of this invention can be achieved.

Now in order that those skilled in the art may better understand how the present invention can be practiced, the following examples are given by way of illustration and not by way of limitation.

All parts and percents referred to herein are by weight and all viscosities measured at 25° C. unless otherwise specified.

EXAMPLE 1

To a flask was added 77.1 g. of (CH$_3$)$_3$Si[(CH$_3$)$_2$]$_7$[OSi(CH$_3$)H]$_3$OSi(CH$_3$)$_3$ 175 g. of $$CH_2=CHCH_2(OC_2H_3)_{12}O\overset{O}{\underset{\|}{C}}NHC_2H_5$$

42.8 g. of n-propanol, 42.8 g. of toluene and 0.6 cc. of a 2% platinum (as chloroplatinic acid) solution in isopropanol. The foregoing mixture was heated at 78 to 95° C. for about 30 minutes, filtered, and then stripped to 149° C. at 4 mm. of mercury pressure. The product, (CH$_3$)$_3$Si[OSi(CH$_3$)$_2$]$_7$[OSi(CH$_3$)CH$_2$CH$_2$CH$_2$(OC$_2$H$_4$)$_{12}$OĊNHC$_2$H$_5$]$_3$OSi(CH$_3$)

had a viscosity of 279 cs., a refractive index of 1.4499 and a specific gravity of 1.079.

EXAMPLE 2

The procedure of Example 1 was repeated except that 83.4 g. of the siloxane (CH$_3$)$_3$Si[OSi(CH$_3$)$_2$]$_9$[OSi(CH$_3$)H]$_3$OSi(CH$_3$)$_3$ was used and the reaction was carried out at 85 to 110° C.

(CH$_3$)$_3$Si[OSi(CH$_3$)$_2$]$_9$[OSi(CH$_3$)CH$_2$CH$_2$CH$_2$(OC$_2$H$_4$)$_{12}$OĊNHC$_2$H$_5$]$_3$OSi(CH$_3$)

had a viscosity of 322 cs., a refractive index of 1.4487 and a specific gravity of 1.067.

EXAMPLE 3

The procedure of Example 1 was repeated except that 73.7 g. of the siloxane (CH$_3$)$_3$Si[OSi(CH$_3$)$_2$]$_{13}$[OSi(CH$_3$)H]$_5$OSi(CH$_3$)$_3$ was used, 41.4 g. of the n-propanol and toluene was used, the reaction was carried out at 90 to 99° C. and the mixture stripped to 151° C. at 5 mm. of pressure. The product, (CH$_3$)$_3$Si[OSi(CH$_3$)$_2$]$_{13}$—[OSi(CH$_3$)CH$_2$CH$_2$CH$_2$(OC$_2$H$_4$)$_{12}$OĊNHC$_2$H$_5$]$_5$OSi(CH$_3$)$_3$ had a viscosity of 545 cs., a refractive index of 1.4510 and a specific gravity of 1.074.

EXAMPLE 4

To a flask there was added 84.2 g. of $(CH_3)_3Si[OSi(CH_3)_2]_9[OSi(CH_3)H]_3OSi(CH_3)_3$ 188.7 g. of $$CH_2=CHCH_2(OC_2H_4)_{14}O\overset{O}{\underset{\|}{C}}CH_3$$

45.4 g. of n-propanol, 45.4 g. of toluene and 0.6 cc. of a 2% platinum (as chloroplatinic acid) solution in isopropanol. The foregoing mixture was heated at 80 to 95° C. for about 30 minutes, filtered, and then stripped to 160° C. at 6 mm. of mercury pressure. The product, $$(CH_3)_3Si[OSi(CH_3)_2]_9[OSi(CH_3)CH_2CH_2CH_2(OC_2H_4)_{14}O\overset{O}{\underset{\|}{C}}CH_3]_3OSiMe_3$$

had a viscosity of 216 cs., a refractive index of 1.4480 and a specific gravity of 1.073.

EXAMPLE 5

When the siloxanes and unsaturated compounds specified below are reacted following the procedure of the preceding examples, the indicated product is obtained.

siloxane additive of this invention followed by the addition of crude toluene diisocyanate in an amount equivalent to 105% of the hydroxyl groups in the polyether (i.e., a 5% excess of isocyanate was added). The above ingredients were hand-mixed on a Hamilton Beach malt-type mixer mounted on a drill press stand. Mixing time was five seconds at 2200 r.p.m.

In order to evaluate the characteristics of the rigid urethane foams prepared in accordance with this invention, immediately after preparation (supra) they were poured into an L-shaped mold having a 10½ inch by 15 inch base and a 10½ inch by 24 inch vertical leg, both base and leg being 1 inch deep. The mold was lined with a polytetrafluoroethylene coated fabric sheet and coated with a thin layer of paste wax for release. At the forward part of the mold is a three inch hinged flap where the foam ingredients were poured. The ingredients were poured into the mold for a period of five seconds, the flap immediately closed and clamped, and the foams allowed to rise and cure for about ten minutes before releasing. The quart cups containing the excess foam were weighed after pouring to insure that all panels were of equal charge or quantity.

In the L-shaped mold, the foam must travel horizontally

| Siloxane | Unsaturated compound | Product |
|---|---|---|
| $CH_3Si\{[OSi(CH_3)_2]_8[OSi(CH_3)H]_5-$<br>$OSi(CH_3)_2H\}_3$ | $CH_2=CHCH_2CH_2(OC_2H_4)_9O\overset{O}{\underset{\|}{C}}NHC_3H_7$ | $CH_3Si\{[OSi(CH_3)_2]_8[O\overset{CH_3}{\underset{\|}{Si}}(CH_2)_4-$<br>$(OC_2H_4)_9O\overset{O}{\underset{\|}{C}}NHC_3H_7]_5O\overset{(CH_3)_2}{\underset{\|}{Si}}(CH_2)_4-$<br>$(OC_2H_4)_9O\overset{O}{\underset{\|}{C}}NHC_3H_7\}_3$ |
| $Si\{[OSi(CH_3)_2]_{20}[OSi(CH_3)H]_5-$<br>$OSi(CH_3)_2H\}_4$ | $CH_2=CH(CH_2)_4(OC_2H_4)_{25}O\overset{O}{\underset{\|}{C}}C_2H_5$ | $Si\{[OSi(CH_3)_2]_{20}[O\overset{CH_3}{\underset{\|}{Si}}(CH_2)_6(OC_2H_4)_{25}-$<br>$O\overset{O}{\underset{\|}{C}}C_2H_5]_5O\overset{(CH_3)_2}{\underset{\|}{Si}}(CH_2)_6(OC_2H_4)_{25}O\overset{O}{\underset{\|}{C}}C_2H_5\}_4$ |
| $C_6H_5Si\{[OSi(CH_3)_2]_{35}[OSi(CH_3)H]_9-$<br>$OSi(CH_3)_3\}_3$ | $CH_2=C(CH_3)CH_2(OC_2H_4)_{18}O\overset{O}{\underset{\|}{C}}OCH_3$ | $C_6H_5Si\{[OSi(CH_3)_2]_{35}[O\overset{CH_3}{\underset{\|}{Si}}CH_2CH(CH_3)-$<br>$CH_2(OC_2H_4)_{18}O\overset{O}{\underset{\|}{C}}OCH_3]_9OSi(CH_3)_3\}_3$ |
| $(CH_3)_2CHSi\{[OSi(CH_3)_2]_{50}[OSi-$<br>$(CH_3)H]_{10}OSi(CH_3)_3\}_3$ | $CH_2=CHCH_2(OC_2H_4)_{10}O\overset{O}{\underset{\|}{C}}NHC_6H_5$ | $(CH_3)_2CHSi\{[OSi(CH_3)_2]_{50}[O\overset{CH_3}{\underset{\|}{Si}}(CH_2)_3(OC_2H_4)_{10}-$<br>$O\overset{O}{\underset{\|}{C}}NHC_6H_5]_{10}OSi(CH_3)_3\}_3$ |
| $H(CH_3)_2Si[OSi(CH_3)_2]_{192}[OSi(CH_3)-$<br>$H]_{30}OSi(CH_3)_2H$ | $CH_2=CH(CH_2)_{10}(OC_2H_4)_{30}O\overset{O}{\underset{\|}{C}}OC_6H_5$ | $C_6H_5O\overset{O}{\underset{\|}{C}}O(C_2H_4O)_{30}(CH_2)_{12}\overset{(CH_3)_2}{\underset{\|}{Si}}[OSi(CH_3)_2]_{192}-$<br>$[O\overset{CH_3}{\underset{\|}{Si}}(CH_2)_{12}(OC_2H_4)_{30}O\overset{O}{\underset{\|}{C}}OC_6H_5]_{30}O\overset{(CH_3)_2}{\underset{\|}{Si}}(CH_2)_{12}$<br>$(OC_2H_4)_{30}O\overset{O}{\underset{\|}{C}}OC_6H_5$ |
| $H(CH_3)_2Si[OSi(CH_3)_2]_{100}[OSi(CH_3)-$<br>$H]_{23}OSi(CH_3)_2H$ | $CH_2=CHCH_2(OC_2H_4)_{13}O\overset{O}{\underset{\|}{C}}NHC_4H_9$ | $C_4H_9NH\overset{O}{\underset{\|}{C}}O(C_2H_4O)_{13}(CH_2)_3\overset{(CH_3)_2}{\underset{\|}{Si}}[OSi(CH_3)_2]_{100}-$<br>$[O\overset{CH_3}{\underset{\|}{Si}}(CH_2)_3(OC_2H_4)_{13}O\overset{O}{\underset{\|}{C}}NHC_4H_9]_{23}O\overset{(CH_3)_2}{\underset{\|}{Si}}$<br>$(OC_2H_4)_{13}O\overset{O}{\underset{\|}{C}}NHC_4H_9$ |

EXAMPLE 6

A mixture of 193.3 parts of a sucrose polyether, 76.3 parts of monofluorotrichloromethane, 3.1 parts of a 33% solution of triethylenediamine in dipropylene glycol and 2.1 parts of dimethylaminoethanol was placed in a one quart Dixie cup. There was then added 2.0 parts of the along the base of the mold, round a 90° corner, and then travel vertically. The narrowness of the mold and the cornering place shearing effects on the rising foam mass which simulate cast-in-place use conditions. After the foam had cured, it was removed from the mold and cut in half vertically. First the height to which the foam rose was measured. One-half was then cut horizontally 3½ inches above the base. At this point maximum flow lines (striations) are observed and are rated. The size of the cells in the foam was also rated. The following scale was used in the evaluations.

| Value | Cells | Flow lines |
|---|---|---|
| 10 | } Very fine | None. |
| 9 | | |
| 8 | } Fine | Few. |
| 7 | | |
| 6 | } Slightly coarse | Medium. |
| 5 | | |
| 4 | } Coarse | Many. |
| 3 | | |
| 2 | } Very coarse | Very many. |
| 1 | | |

The following siloxane additives were employed in the above formulation and process to make rigid urethane foams.

(A) The siloxane of Example 2
(B) The siloxane of Example 3
(C) The siloxane of Example 4

(D) 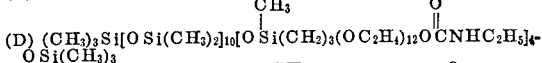

(E) 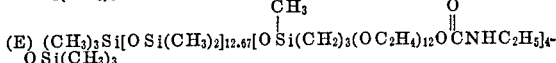

(F) 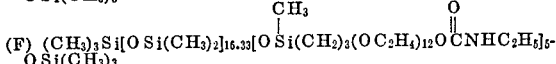

(G) 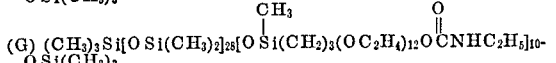

(H) 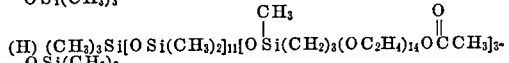

(I) 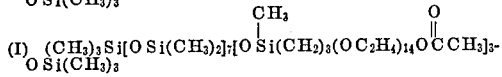

In the table below the evaluations of the siloxane additives above is set forth.

| Additive | Height (inches) | Cells | Flow lines |
|---|---|---|---|
| A | 20.5 | 8 | 7 |
| B | 21 | 9 | 9 |
| C | 20 | 8 | 7 |
| D | 20 | 9 | 9 |
| E | 20.4 | 9 | 9 |
| F | 20.4 | 9 | 9 |
| G | 21 | 8 | 9 |
| H | 18 | 7 | 6 |
| I | 18.7 | 7 | 6 |

EXAMPLE 7

When the compounds of Example 5 are substituted for those of Example 6, similar results are obtained.

That which is claimed is:
1. A compound selected from the group consisting of siloxanes having the average structural formulae (1) 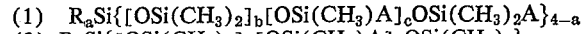
(2) 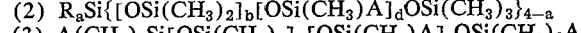
(3) $A(CH_3)_2Si[OSi(CH_3)_2]_b[OSi(CH_3)A]_eOSi(CH_3)_2A$
and
(4) $(CH_3)_3Si[OSi(CH_3)_2]_b[OSi(CH_3)A]_dOSi(CH_3)_3$ in which formulae
R is a hydrocarbon radical free of aliphatic unsaturation and contains from 1 to 10 carbon atoms,
A is a radical of the structure

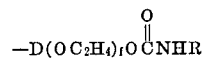

wherein
D is an alkylene radical,
R is as defined above,
$f$ has an average value from 9–30,
$a$ has an average value from 0 to 1,
$b$ has an average value from 6 to 192,
$c$ has an average value from 0 to 30,
$d$ has an average value from 3 to 30, and
$e$ has an average value from 1 to 30,
the ratio of the $OSi(CH_3)_2$ units to the $OSi(CH_3)A$ and/or $OSi(CH_3)_2A$ units in the siloxane being in the range of 2:1 to 6:1.

2. A compound as defined in claim 1 which has Formula 3.

3. A compound as defined in claim 2 wherein D is a propylene radical, $f$ is about 12 and R is $C_2H_5$.

4. A compound as defined in claim 1 which has Formula 4.

5. A compound as defined in claim 4 wherein D is a propylene radical, $f$ is about 12 and R is $C_2H_5$.

References Cited

UNITED STATES PATENTS

| | | |
|---|---|---|
| 2,834,748 | 5/1958 | Bailey et al. _____ 260—448.2 X |
| 2,839,558 | 6/1958 | Kirkpatrick et al. __ 260—448.2 X |
| 2,846,458 | 8/1958 | Haluska. |
| 3,168,543 | 2/1965 | Black et al. _____ 260—448.2 |
| 3,298,919 | 1/1967 | Bishop et al. _____ 260—46.5 |
| 3,402,192 | 9/1968 | Haluska. |

TOBIAS E. LEVOW, Primary Examiner

P. F. SHAVER, Assistant Examiner

U.S. Cl. X.R.

260—2.5